(12) United States Patent
Wang et al.

(10) Patent No.: US 12,140,931 B2
(45) Date of Patent: Nov. 12, 2024

(54) SIS IDENTIFICATION METHOD OF REVERSIBLE RECOVERY FAULT-ORIENTED WORKSHOP KEY MANUFACTURING RESOURCES

(71) Applicant: Xi'an University of Posts & Telecommunications, Xi'an (CN)

(72) Inventors: Chuang Wang, Xi'an (CN); Yaqian Feng, Xi'an (CN); Guanghui Zhou, Xi'an (CN); Dongzhe Han, Xi'an (CN)

( * ) Notice: Subject to any disclaimer, the term of this patent is extended or adjusted under 35 U.S.C. 154(b) by 382 days.

(21) Appl. No.: 17/810,371

(22) Filed: Jul. 1, 2022

(65) Prior Publication Data
US 2023/0013897 A1   Jan. 19, 2023
US 2023/0273602 A1   Aug. 31, 2023

(30) Foreign Application Priority Data

Jul. 14, 2021 (CN) .......................... 202110795439.8

(51) Int. Cl.
G05B 19/418 (2006.01)

(52) U.S. Cl.
CPC ... *G05B 19/4184* (2013.01); *G05B 19/41865* (2013.01); *G05B 19/4188* (2013.01)

(58) Field of Classification Search
CPC .......... G05B 19/4184; G05B 19/41865; G05B 19/4188; G06Q 10/0633; G06Q 50/04; G06Q 10/06312; G06Q 10/0631; Y02P 90/30; G06F 30/20; G06F 16/284; G06F 2111/08; G06K 17/0029
See application file for complete search history.

*Primary Examiner* — Charles Cai
(74) *Attorney, Agent, or Firm* — Novoclaims Patent Services LLC; Mei Lin Wong

(57) ABSTRACT

A SIS identification method of reversible recovery fault-oriented workshop key manufacturing resources is that based on SIS model in the infectious disease research theory, the workpieces and manufacturing resources required in a production order are linked together through database technology to establish a discrete production workshop manufacturing network. The SIS model is configured to solve a change of the number of bottlenecks of other manufacturing resources caused by the initial fault manufacturing resources over time. The weighted result of a peak number of bottleneck resources and its time to reach the peak is marked to determine the importance of the initial fault manufacturing resources. Through the sorting of importance, the key manufacturing resource nodes in the discrete workshop are finally selected. The invention sorts out other key manufacturing resources that need to pay attention in production management in the manufacturing workshop to plan in advance and to improve the efficiency.

1 Claim, 2 Drawing Sheets

SIS IDENTIFICATION METHOD OF REVERSIBLE RECOVERY FAULT-ORIENTED WORKSHOP KEY MANUFACTURING RESOURCES

CROSS REFERENCE OF RELATED APPLICATION

This is a non-provisional application that claims priority to a Chinese application, Chinese application number CN202110795439.8, filed Jul. 14, 2021, the entire contents of each of which are expressly incorporated herein by reference.

BACKGROUND OF THE PRESENT INVENTION

Field of Invention

The present invention relates to a technical field of production processing control, and more particularly to a SIS identification method of reversible recovery fault-oriented workshop key manufacturing resources.

Description of Related Arts

Due to the dramatical market competitive, enterprises focus on the improvement and optimization of the production system and production process to meet the needs of different customers. The requirements for the efficient and controllable production system and manufacturing resources, such as personnel, machines, materials, and workpieces related to production activities, can be achieved by organic combination and mutual cooperation. Scientific and systematic analysis and quantitative evaluation of the production system is able to enhance the stability of discrete manufacturing workshops and improve the on-time completion rate of workpieces, so as to improve the economic efficiency of enterprises.

The provision of production system analysis is to fully understand and accurately model the production links of discrete manufacturing workshops. By establishing key indicators, risk points and key nodes of the production plan within a production cycle of the workshop can be identified, while accurate data can be provided and supported for subsequent targeted improvements.

SUMMARY OF THE PRESENT INVENTION

In order to solve the above problems, an objective of the present invention is to provide a SIS identification method of reversible recovery fault-oriented workshop key manufacturing resources. First, through information technology and database technology, an automatic link of workpieces produced in a production cycle is established to link with their production plan, production process, and manufacturing resources. Second, according to SIS model in the infectious disease research theory, it is configured to have an initial "fault has been occurred" manufacturing resource and a "fault has not been occurred" manufacturing resource in discrete workshop manufacturing resources. Third, a change of a number of bottleneck of other manufacturing resources over a time is determined through the SIS model. Then, an importance of the initial "fault has been occurred" manufacturing resource is marked by weighting a peak value of the number of bottleneck and a time length to reach the peak value. Next, groupings of the initial "fault has been occurred" manufacturing resource and the "fault has not been occurred" manufacturing resource in the workshop manufacturing resources are changed while the importance is re-determined. Repeat the steps until the importance of all possible groupings is obtained. Finally, key manufacturing resource nodes in the discrete workshop manufacturing system are obtained according to an order of all the importance.

According to the present invention, the foregoing and other objects and advantages are attained by:

a SIS identification method of reversible recovery fault-oriented workshop key manufacturing resources for establishing a production model comprises the steps, executed by a computerized device, such as a computer or a server, of:

Step 1: Based on Internet RFID technology and relational SQL database, establish an automatic link of workpieces produced in a production cycle with their production plan, production process, and manufacturing resources, and according to SIS model in the infectious disease research theory, assume a total number of the manufacturing resources as a constant as N throughout a production cycle of a manufacturing workshop, and configure an initial "fault has been occurred" manufacturing resource and a "fault has not been occurred" manufacturing resource in discrete workshop manufacturing resources as $X(t_0)$ and $Y(t_0)$ respectively.

Configure a relationship between $X(t_0)$ and $Y(t_0)$ as:

$$X(t_0)=\{x_1(t_0),x_2(t_0),x_3(t_0),\ldots,x_j(t_0)\}$$

$$Y(t_0)=\{y_1(t_0),y_2(t_0),y_3(t_0),\ldots,y_k(t_0)\}$$

wherein:
$X_j(t_0)$ is the $j^{th}$ initial "fault has been occurred" manufacturing resource at the start time;
$Y_k(t_0)$ is the $k^{th}$ initial "fault has not been occurred" manufacturing resource at the start time.

Step 2: Based on Internet RFID technology and relational SQL database, establish a second automatic link among the workpieces, the production plan, the production process, and the corresponding manufacturing resources within the production cycle in the manufacturing workshop. Convert the second automatic link into a plurality of connecting network edges in a workshop manufacturing system network. Finally map weighted edges of a processing time and all the manufacturing resources, including machine tools, cutting tools, fixtures, measuring tools and personnel in the production process, to a plurality of network nodes in the workshop manufacturing system network.

Step 3: According to a grouping result in the Step 1, configure a probability of eventual failure of the "fault has not been occurred" manufacturing resource caused by the "fault has been occurred" manufacturing resource as $\beta$, configure an effective number in unit of time for the "fault has not been occurred" manufacturing resource to the "fault has been occurred" manufacturing resource as $\gamma$, and configure a ratio of a number of the "fault has been occurred" manufacturing resource that has failed again to a total number of the "fault has been occurred" manufacturing resource as $\lambda$.

Step 4: As shown in FIG. 3, configure a fault propagation rate between the manufacturing resources with a connection relationship thereof as a ratio of the weight of the edge connecting two of the manufacturing resources and the maximum weight in the entire network. $\beta_{ij}$ is determined as:

$$\beta_{ij} = \left(\frac{w_{ij}}{w_{max}}\right)^{\delta}$$

wherein δ is the contact probability of two of the manufacturing resources. The contact probability is set as 1 when there is a connecting edge between the two manufacturing resources. The contact probability is set as 0 when there is no connecting edge between the two manufacturing resources.

Step 5: Through the SIS model, determine a change of a number of bottleneck occurring over a time for the "fault has not been occurred" manufacturing resource due to the initial the "fault has been occurred" manufacturing resource.

$$I(t) = \frac{N(\lambda\beta - \gamma)}{\lambda\beta} \bigg/ \left[\left(\frac{N(\lambda\beta - \gamma)}{I_0\lambda\beta} - 1\right)e^{-(\lambda\beta - \gamma)t} + 1\right]$$

wherein I(t) is the number of bottleneck occurring in the "fault has been occurred" manufacturing resources over the time.

Step 6: Mark an importance of the initial "fault has been occurred" manufacturing resource by weighting a peak value of the number of bottleneck and a time length to reach the peak value.

$$ZYD_{(i)} = k_1 T_{(i)} + k_2 \overline{P}_{(i)}$$

wherein $ZYD_{(i)}$ is the importance of the $i^{th}$ group of initial "fault has been occurred" manufacturing resource;

T(i) is the peak time when the number of bottlenecks in the $i^{th}$ group reaches the peak value;

$\overline{P}_{(i)}$ is the peak value of the number of bottleneck in the $i^{th}$ group;

$k_1$, $k_2$ are the weights of peak time and peak value.

Step 7: As shown in FIG. 4, change groupings of the initial "fault has been occurred" manufacturing resource and the "fault has not been occurred" manufacturing resource in the workshop manufacturing resources and re-determine the importance according to steps 1 to 6, and repeat it until the importance of all possible groupings is obtained.

Step 8: Obtain key manufacturing resource nodes in the discrete workshop manufacturing system according to an order of all the importance, so as to establish the production model based on the key manufacturing resource nodes.

The present invention has the following advantages:

1) The key manufacturing resources can be determined in the discrete manufacturing workshop under the reversible recovery manufacturing resource fault environment.

2) The importance of key manufacturing resources can be quantitatively determined by weighting the peak time and peak value of the number of bottleneck resources.

3) The effect of the connection relationship between manufacturing resources in response to the reversible recovery fault propagation can be determined.

4) Through the sorting of fault propagation speed, other key manufacturing resources that need to pay attention in production management in the manufacturing workshop can be sorted out, such that plans can be prepared in advance to improve the flexibility of production organization.

DETAILED DESCRIPTION OF THE PREFERRED EMBODIMENT

A SIS identification method of reversible recovery fault-oriented workshop key manufacturing resources is configured for establishing a production model, wherein the method comprises the following steps which are executed by a computerized device.

Figure 1:
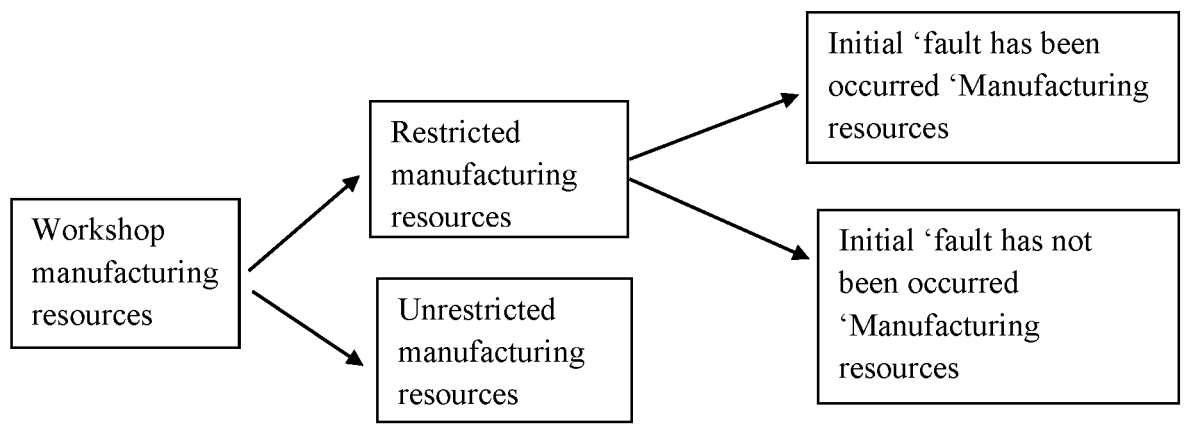
FIG. 1 is a block diagram illustrating a classification of workshop key manufacturing resources according to the present invention.

Step 1: As shown in FIG. 1, based on Internet RFID technology and relational SQL database, establish an automatic link of workpieces produced in a production cycle with their production plan, production process, and manufacturing resources, and according to SIS model in the infectious disease research theory, assume a total number of the manufacturing resources as a constant as N throughout a production cycle of a manufacturing workshop, and configure an initial "fault has been occurred" manufacturing resource and a "fault has not been occurred" manufacturing resource in discrete workshop manufacturing resources as $X(t_0)$ and $Y(t_0)$ respectively.

Configure a relationship between $X(t_0)$ and $Y(t_0)$ as:

$$X(t_0) = \{x_1(t_0), x_2(t_0), x_3(t_0), \ldots, x_j(t_0)\}$$

$$Y(t_0) = \{y_1(t_0), y_2(t_0), y_3(t_0), \ldots, y_k(t_0)\}$$

wherein:

$X_j(t_0)$ is the $j^{th}$ initial "fault has been occurred" manufacturing resource at the start time;

$Y_k(t_0)$ is the $k^{th}$ initial "fault has not been occurred" manufacturing resource at the start time.

Figure 2:
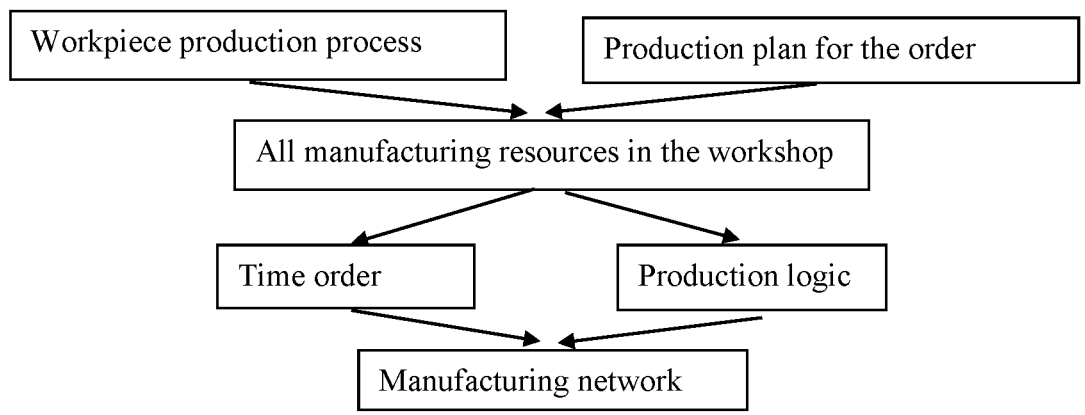
FIG. 2 is a block diagram illustrating a network building framework of workshop key manufacturing resources according to the present invention.

Step 2: As shown in FIG. 2, based on Internet RFID technology and relational SQL database, establish a second automatic link among the workpieces, the production plan, the production process, and the corresponding manufacturing resources within the production cycle in the manufacturing workshop. Convert the second automatic link into a plurality of connecting network edges in a workshop manufacturing system network. Finally map weighted edges of a processing time and all the manufacturing resources, including machine tools, cutting tools, fixtures, measuring tools and personnel in the production process, to a plurality of network nodes in the workshop manufacturing system network.

Step 3: According to a grouping result in the Step 1, configure a probability of eventual failure of the "fault has not been occurred" manufacturing resource caused by the "fault has been occurred" manufacturing resource as β, configure an effective number in unit of time for the "fault has not been occurred" manufacturing resource to the "fault has been occurred" manufacturing resource as γ, and configure a ratio of a number of the "fault has been occurred" manufacturing resource that has failed again to a total number of the "fault has been occurred" manufacturing resource as λ.

Figure 3:
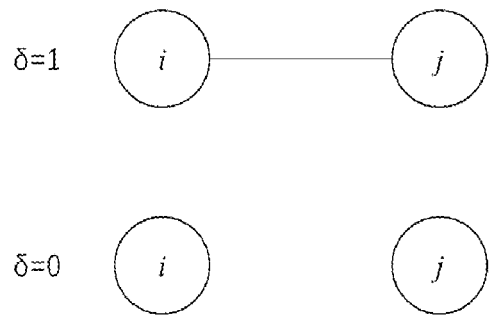
FIG. 3 illustrates values of contact probabilities for different manufacturing resources according to the present invention.

Step 4: As shown in FIG. 3, configure a fault propagation rate between the manufacturing resources with a connection relationship thereof as a ratio of the weight of the edge connecting two of the manufacturing resources and the maximum weight in the entire network. $\beta_{ij}$ is determined as:

$$\beta_{ij} = \left(\frac{w_{ij}}{w_{max}}\right)^{\delta}$$

wherein $\delta$ is the contact probability of two of the manufacturing resources. The contact probability is set as 1 when there is a connecting edge between the two manufacturing resources. The contact probability is set as 0 when there is no connecting edge between the two manufacturing resources.

Step 5: Through the SIS model, determine a change of a number of bottleneck occurring over a time for the "fault has not been occurred" manufacturing resource due to the initial the "fault has been occurred" manufacturing resource.

$$I(t) = \frac{N(\lambda\beta - \gamma)}{\lambda\beta} / \left[\left(\frac{N(\lambda\beta - \gamma)}{I_0 \lambda\beta} - 1\right)e^{-(\lambda\beta-\gamma)t} + 1\right]$$

wherein I(t) is the number of bottleneck occurring in the "fault has been occurred" manufacturing resources over the time.

Step 6: Mark an importance of the initial "fault has been occurred" manufacturing resource by weighting a peak value of the number of bottleneck and a time length to reach the peak value.

$$ZYD_{(i)} = k_1 T_{(i)} + k_2 \overline{P}_{(i)}$$

wherein $ZYD_{(i)}$ is the importance of the $i^{th}$ group of initial "fault has been occurred" manufacturing resource;

T(i) is the peak time when the number of bottlenecks in the $i^{th}$ group reaches the peak value;

$\overline{P}_{(i)}$ is the peak value of the number of bottleneck in the $i^{th}$ group;

$k_1$, $k_2$ are the weights of peak time and peak value.

Figure 4:
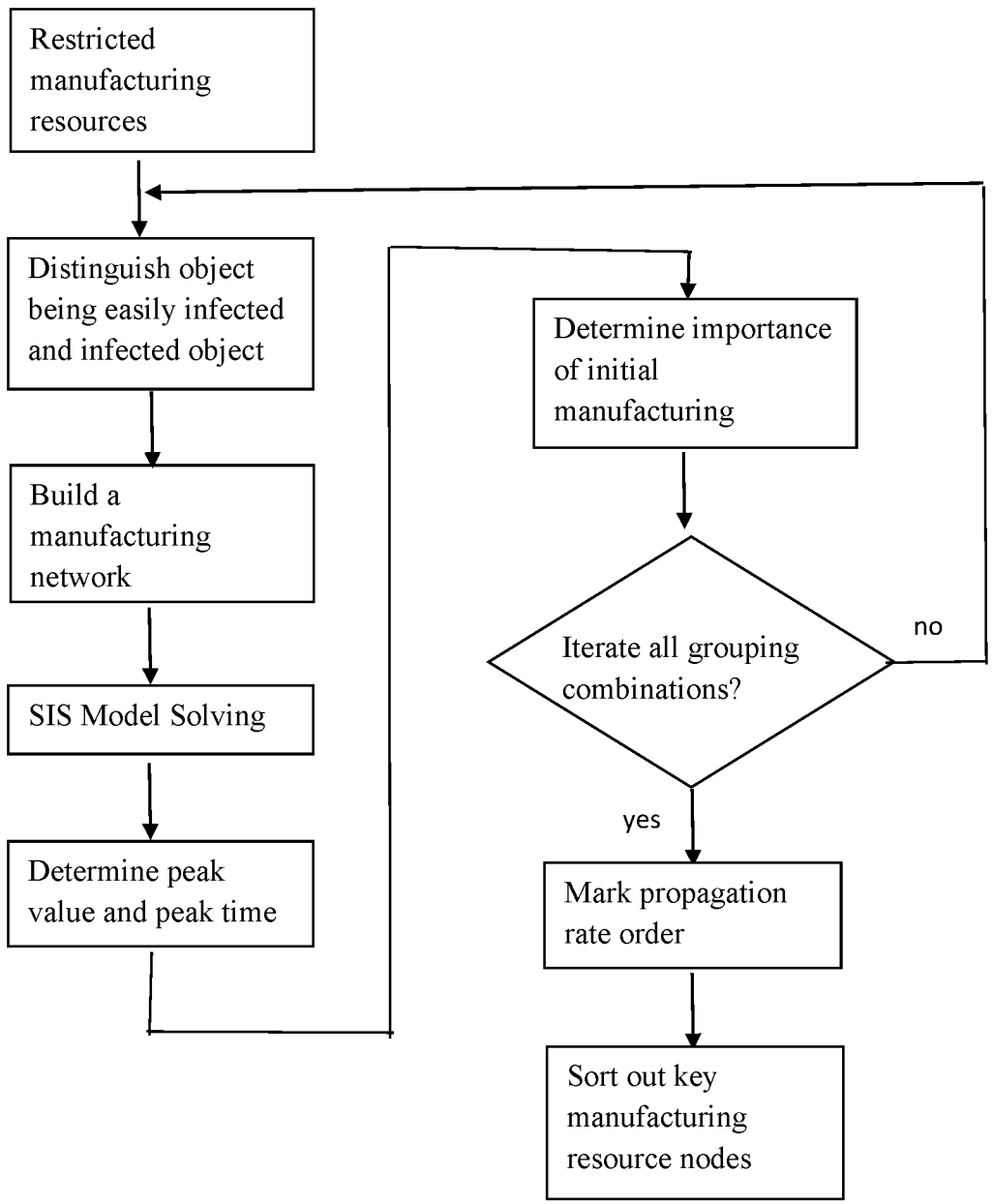
FIG. 4 is a flowchart illustrating key manufacturing resource node identification according to the present invention.

Step 7: As shown in FIG. 4, change groupings of the initial "fault has been occurred" manufacturing resource and the "fault has not been occurred" manufacturing resource in the workshop manufacturing resources and re-determine the importance according to steps 1 to 6, and repeat it until the importance of all possible groupings is obtained.

Step 8: Obtain key manufacturing resource nodes in the discrete workshop manufacturing system according to an order of all the importance, so as to establish the production model based on the key manufacturing resource nodes. In other words, the production model can be accurately established by programming using the key manufacturing resource nodes so as to optimize the production system.

What is claimed is:

1. A SIS identification method of reversible recovery fault-oriented workshop key manufacturing resources for establishing a production model, comprising the steps, executed by a computerized device, of:

step 1: based on Internet RFID technology and relational SQL database, establishing an automatic link of workpieces produced in a production cycle with their production plan, production process, and manufacturing resources; according to SIS model in the infectious disease research theory, assuming a total number of the manufacturing resources as a constant as U throughout a production cycle of a manufacturing workshop, and configuring an initial "fault has been occurred" manufacturing resource and a "fault has not been occurred" manufacturing resource in discrete workshop manufacturing resources as $X(t_0)$ and $Y(t_0)$ respectively;

wherein a relationship between $X(t_0)$ and $Y(t_0)$ is configured as:

$X(t_0) = \{x_1(t_0), x_2(t_0), x_3(t_0), \ldots, x_j(t_0)\}$ $Y(t_0) = \{y_1(t_0), y_2(t_0), y_3(t_0), \ldots, y_k(t_0)\}$ wherein:

$X_j(t_0)$ is the $j^{th}$ initial "fault has been occurred" manufacturing resource at the start time;

$Y_k(t_0)$ is the $k^{th}$ initial "fault has not been occurred" manufacturing resource at the start time;

step 2: based on Internet RFID technology and relational SQL database, establishing a second automatic link among the workpieces, the production plan, the production process, and the corresponding manufacturing resources within the production cycle in the manufacturing workshop; converting the second automatic link into a plurality of connecting network edges in a workshop manufacturing system network, and finally mapping weighted edges of a processing time and all the manufacturing resources, including machine tools, cutting tools, fixtures, measuring tools and personnel in the production process, to a plurality of network nodes in the workshop manufacturing system network;

step 3: according to a grouping result in the step 1, configuring a probability of eventual failure of the "fault has not been occurred" manufacturing resource caused by the "fault has been occurred" manufacturing resource as $\beta$, configuring an effective number in unit of time for the "fault has not been occurred" manufacturing resource to the "fault has been occurred" manufacturing resource as $\gamma$, and configuring a ratio of a number of the "fault has been occurred" manufacturing resource that has failed again to a total number of the "fault has been occurred" manufacturing resource as $\lambda$;

step 4: configuring a fault propagation rate between the manufacturing resources with a connection relationship thereof as a ratio of the weight of the edge connecting two of the manufacturing resources and the maximum weight in the entire network, wherein $\beta_{ij}$ is determined as:

$$\beta_{ij} = \left(\frac{w_{ij}}{w_{max}}\right)^{\delta}$$

wherein $\delta$ is the contact probability of two of the manufacturing resources, wherein the contact probability is set as 1 when there is a connecting edge between the two manufacturing resources, wherein the contact probability is set as 0 when there is no connecting edge between the two manufacturing resources;

step 5: through the SIS model, determining a change of a number of bottleneck occurring over a time for the "fault has not been occurred" manufacturing resource due to the initial the "fault has been occurred" manufacturing resource;

$$I(t) = \frac{N(\lambda\beta - \gamma)}{\lambda\beta} / \left[\left(\frac{N(\lambda\beta - \gamma)}{I_0 \lambda\beta} - 1\right)e^{-(\lambda\beta-\gamma)t} + 1\right]$$

wherein I(t) is the number of bottleneck occurring in the "fault has been occurred" manufacturing resources over the time;

Step 6: marking an importance of the initial "fault has been occurred" manufacturing resource by weighting a peak value of the number of bottleneck and a time length to reach the peak value;

$$ZYD_{(i)} = k_1 T_{(i)} + k_2 \overline{P}_{(i)}$$

wherein $ZYD_{(i)}$ is the importance of the $i^{th}$ group of initial "fault has been occurred" manufacturing resource;

$T(i)$ is the peak time when the number of bottlenecks in the $i^{th}$ group reaches the peak value;

$\overline{P}_{(i)}$ is the peak value of the number of bottleneck in the $i^{th}$ group;

$k_1$, $k_2$ are the weights of peak time and peak value;

step 7: changing groupings of the initial "fault has been occurred" manufacturing resource and the "fault has not been occurred" manufacturing resource in the workshop manufacturing resources and re-determine the importance according to steps 1 to 6, and repeat it until the importance of all possible groupings is obtained; and step 8: obtaining key manufacturing resource nodes in the discrete workshop manufacturing system according to an order of all the importance, so as to establish the production model based on the key manufacturing resource nodes.

* * * * *